United States Patent [19]

Loxham

[11] 3,854,823
[45] Dec. 17, 1974

[54] MEASURING AND COUNTING SYSTEMS
[75] Inventor: John Loxham, Bletchley, England
[73] Assignee: Cranfield Institute of Technology, Cranfield, Bedfordshire, England
[22] Filed: Mar. 3, 1972
[21] Appl. No.: 231,674

[30] Foreign Application Priority Data
Mar. 5, 1971  Great Britain ...................... 6194/71

[52] U.S. Cl. ................................ 356/169, 250/237
[51] Int. Cl. ........................................... G01b 11/04
[58] Field of Search ........ 250/237 G, 237; 356/169, 356/170

[56] References Cited
UNITED STATES PATENTS
2,886,717  5/1959  Williamson et al. ............ 250/237 G
2,886,718  5/1959  Shepherd et al. ................... 356/169
3,533,702  11/1970  Hock et al. .......................... 356/169

FOREIGN PATENTS OR APPLICATIONS
782,831  9/1957  Great Britain ...................... 356/169

Primary Examiner—Ronald J. Stern
Assistant Examiner—Paul K. Godwin
Attorney, Agent, or Firm—Cushman, Darby & Cushman

[57] ABSTRACT

A digital displacement sensing device for sensing the relative displacement of two parts of a mechanism comprises a linear scale having digital indicators, a reading head which can traverse along the scale and means for selectively adjusting the angle between the centre line of the scale the direction of relative displacement of said parts for adjusting the amount of said relative displacement which corresponds to the distance between two adjacent ones of said digital indicators.

9 Claims, 4 Drawing Figures

MEASURING AND COUNTING SYSTEMS

BACKGROUND OF INVENTION

This invention relates to measuring and counting systems and is concerned with digital displacement sensing devices such as are used, for example, with machine tools.

Digital displacement sensing devices are applied to many forms of mechanism, including machine tools, for example to detect the motion of one part of the mechanism relative to another. Relative linear motion can be detected, for example, by means of the relative displacement of a linear scale attached to one part of the mechanism and a scale reading element attached to the other part, the linear scale being disposed with its centre line parallel to the intended direction of relative linear motion of the two parts and the scale reading element being constrained to move relative to the linear scale in a direction parallel to the centre line of the linear scale. Frequently, the scale reading unit will comprise a reading head which co-operates with the linear scale to produce a signal, for example in the form of pulses, according to the number of digital indicators of the linear scale which have been traversed by the reading head. In some instances the spacing of the digital indicators of the scale, and hence of the pulses produced by the reading head, is not satisfactory because the relative movement that is required between the two parts of the mechanism corresponds to a whole number of digital indicators or pulses, plus a fraction of the distance between two successive digital indicators. In some cases the fraction may be a fixed amount and may be established by comparing very accurately the distance that is required with the spacing between successive digital indicators of the particular form of scale used. However, in other cases adjustable facilities are desirable in order to be able to satisfy conditions where the movement that is required is subject to frequent changes and may include any predetermined fraction of the distance between successive digital indicators.

It is an object of the invention to provide such facilities.

SUMMARY OF INVENTION

According to the present invention there is provided a digital displacement sensing device for use in detecting the relative linear motion of two parts of a mechanism which device includes first and second members one of which comprises a linear scale having a plurality of digital indicators, for securing to one of said two parts of a mechanism, and the other of which comprises a scale reading element, for mounting on the other of said two parts of a mechanism so that the scale reading element can track along the linear scale thereby to indicate the progress of the relative linear motion of said two parts of a mechanism, there being means for selectively adjusting the angle between the centre line of the linear scale and the intended direction of the relative linear motion of said two parts of a mechanism whereby the extent of the relative linear motion corresponding to the distance between two successive digital indicators of the scale can be adjusted finely.

The sensing device has one application in association with an electronic servo system for controlling a machine for cutting or shaping the teeth of spiral gears. In such an application, the device may be used to sense the linear displacement between the gear and tool in the direction parallel to the axis of the gear. The electronic servo system may be connected to control the rotation of the tool or of the gear to achieve the desired function between their angular velocities and the reading head of the sensing device can be connected into such a system to introduce signals into it in dependence upon relative movement in the axial direction of the gear or blank. Thus, the servo system may comprise sensing means for setting up two trains of pulses with frequencies representing the angular velocities of the tool and of the gear respectively, frequency changing means for changing the frequency of at least one of said trains and comparator means for comparing the trains after frequency changing. In such a context, the reading head can be connected to add pulses to one or the other of said trains, in dependence upon the sense of the spiral required, and when the pulses are added to a train which is subjected to frequency changing, preferably the addition occurs after frequency changing.

DESCRIPTION OF DRAWINGS

For a better understanding of the invention, and to show how the same may be carried into effect, reference will now be made, by way of example, to the accompanying drawings, in which.

Figure 1:
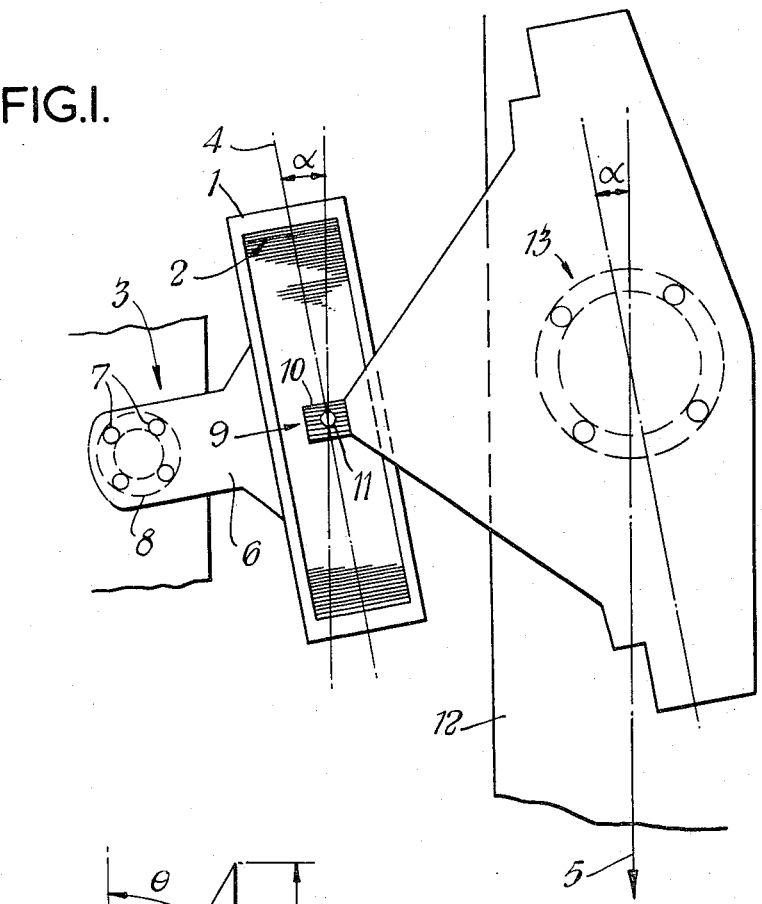
FIG. 1 is a diagram of a digital linear movement sensing device.

Referring first to FIG. 1, there is shown diagrammatically a fixed and wider than normal linear scale 1 having a plurality of digital indicators 2 spaced, for example, at intervals of one half a micrometre. The scale is provided with means by which the centre line 4 of the scale can be set at a predetermined angle $\alpha$ to the intended direction of relative motion (arrow 5) of two parts of a mechanism. These means 3 comprise a member 6 attached to the scale 1 and containing a number of holes 7 to receive the shanks of bolts having T-shaped heads slidable in a groove 8 in a fixed support. Nuts can be tightened on the shanks of the bolts to clamp the scale 1 firmly at a desired angle $\alpha$.

A reading head assembly 9, which includes a scale 10 and at least one photoelectric scale reading element 11, is slidably mounted by a suitable slide 12 and is also provided with means 13 whereby it can be moved through the same angle (up to at least 15°) as the scale 1 in order to retain the critical angular displacement between the lines on the scale and the lines on the scale reading element of the reading head. The means 13 have the same form as the means 3 for the scale 1.

The adjusting facility provides means whereby there can be produced a predetermined number of pulses for a predetermined relative movement of the reading head in relation to the fixed scale in the direction of arrow 5, when the extent of this relative movement is slightly different from that required to produce the same number of pulses with $\alpha = 0°$. The relation between the predetermined number of pulses and the predetermined relative movement is:

Cosine α = length along centre line of scale for predetermined number of pulses/predetermined relative movement The described sensing device is useful for sensing a predetermined extent of relative movement between a gear and a tool in the axial direction of a gear in the forming or grinding of spiral gears on a gear forming or grinding machine in which the rotation of the gear is held in accurate synchronisation at a predetermined ratio with the rotation of the tool by an electronic control system. In the grinding of straight spur gears, the ratio is a simple whole number given by:

Revolutions of grinding wheel/Revolutions of gear being ground = Number of teeth in gear/Number of spirals (usually one) on grinding wheel In the grinding of spiral gears, however, the speed of rotation of the gear must be increased or reduced in relation to the speed of the equivalent spur gear by an amount that corresponds to one complete revolution of the gear for an axial travel equal to the lead of its spiral.

Figure 2:
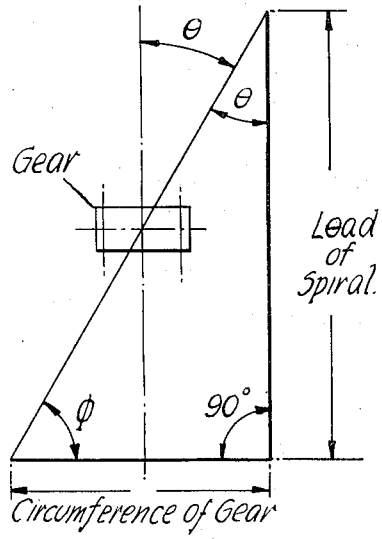
FIG. 2 is a diagram showing a spiral gear and its parameters.

The helix angle $\theta$ of a typical gear and the angle $\phi$ of its spiral are represented in FIG. 2 which shows a gear and a triangle representing the lead of the spiral of the gear. Consider a gear of 200 mm pitch circle diameter D and 15° helix angle.

Angle of spiral, $\phi = 90° - 15° = 75°$

Lead of spiral = 628.32 × 3.732 = 2344.89 mm.

The above lead is the distance the workhead would travel for one complete revolution of the spiral. Assume that there are 64,800 lines on a radial grating attached to a shaft carrying the gear and consider a system of compensation which makes use of a linear grating according to FIG. 1 with lines at 0.5 micrometres spacing and designed to operate at any angle from 0° to 15° to the line 5 along which the reading head 9 moves. With a 15° helix angle, the lead of the spiral is 2344.89 mm so that one pulse is required from the reading head 9 for travel of workhead equal to 2,344.98/64,800 = 0.036185 mm. In this case one pulse must be added to or subtracted from the electronic control system for each movement of the reading head of 36.185 micrometres. Now, a movement of the head along the centre line 4 of 36 micrometres gives a whole number of pulses, in this case 72, so that α can be set such that:

$\cos α = 36.000/36.185 = 0.99489$ $α = 5° - 48'$

An adjustable electronic divider should therefore be connected between the reading head and the control system and be set to send out one pulse for every 72 pulses received from the reading head and the linear grating constituting the linear scale should be set to an angle of 5° − 48'.

Figure 3:
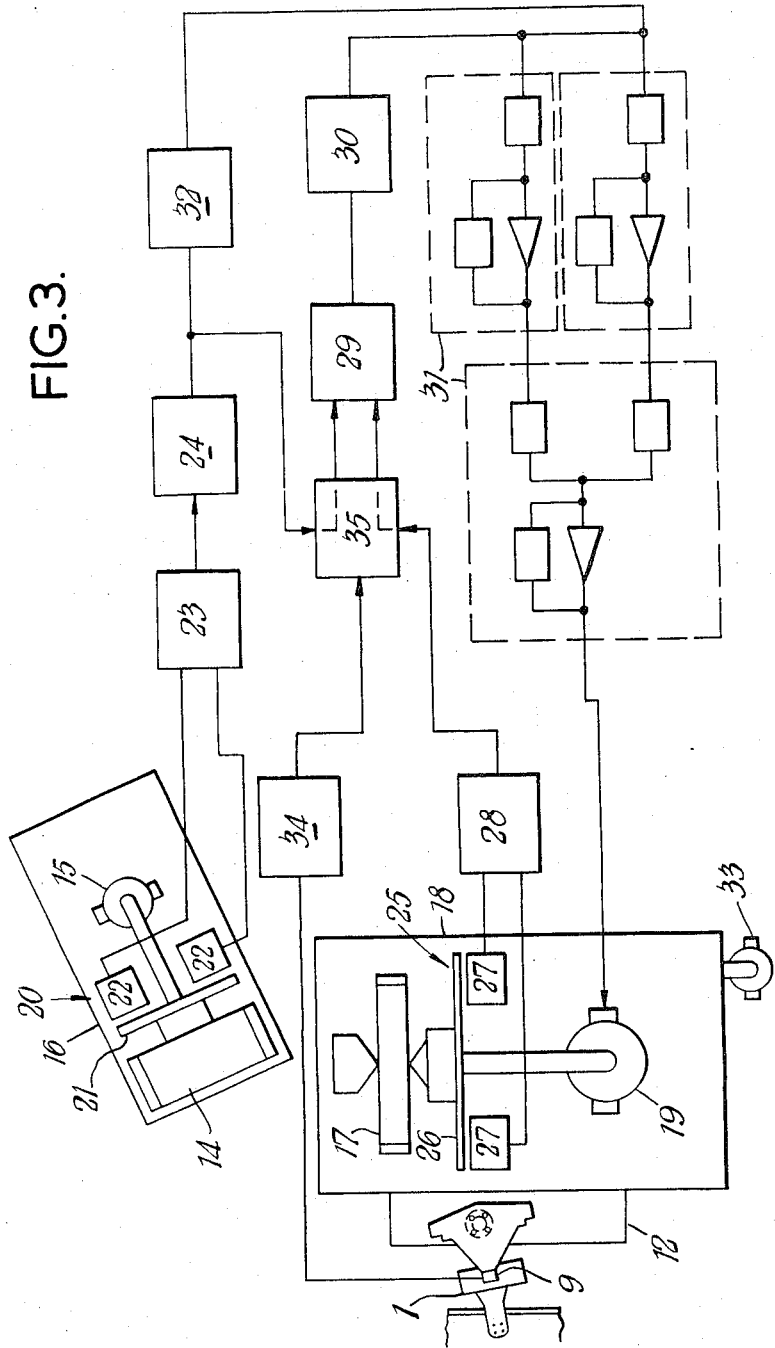
FIG. 3 is a diagram of a spiral gear grinding or cutting machine.

FIG. 3 shows a diagrammatic layout of a spiral gear grinding machine and its control system incorporating the device of FIG. 1 and operating according to the principles set out above. In the usual manner, a grinding wheel or worm 14 of helically ribbed form is carried together with its driving motor 15 by a wheel head 16 and is arranged to engage a work piece 17 in the form of a gear blank or rough-cut gear (or a stack of gear blanks or gears) rotatably carried by a workhead 18 and driven by a further electric motor 19. The motor 15 driving the grinding wheel 14 may be a conventional synchronous a.c. electric motor capable of running at between 1800 and 2500 r.p.m.

Associated with the direct drive from the motor 15 to the grinding wheel 14 is a rotary encoder 20 consisting of a glass or other light transmitting or reflecting disc 21 rotationally fast with the motor 15 and the grinding wheel 14 and bearing a radial line grating for co-operation with a pair of diametrically arranged reading heads 22,22. Each reading head 22 consists of a fixed reference grating mounted in close proximity to the radial grating disc 21 and one or more photo sensitive cells responsive to light through the gratings from a suitable electric light source. On rotation of the radial grating disc 21, Moire fringes are produced as a pattern of alternate light and dark areas passing over the photo sensitive cells which produce a corresponding electrical signal at their outputs.

This signal may be converted electronically to a square wave form or train of pulses whose frequency is exactly dependent on the speed of rotation of the grinding wheel 14. The signal outputs of the two reading heads are processed by eccentricity logic 23 to eliminate the effects of any eccentricity of the disc 21.

Such pulse trains are fed to an electronic gear box 24 which is preset with two integers viz. a multiplier M and a divisor D normally within the range of 1 to 200. The output of the electronic gear box 24 is a further pulse train whose frequency is equal to M/D times the input frequency.

Associated with the drive from the motor 19 to the work piece 17 is a rotary encoder 25 of similar construction to the encoder 20 and having a radial grating disc 26 fast with the work piece 17 and two diametrically opposite reading heads 27,27 which operate in conjunction with an eccentricity logic 28 in order to eliminate the effects of any eccentricity of the disc 26. The motor 19 is a direct drive d.c. servo torque motor and should have the property of being able to rotate over a very wide range of speeds with negligible speed variation and with ample power in hand to provide corrective torque for making small adjustments to the speed of rotation of the workpiece 17.

The electronic gear box 24 is set initially so that the frequency of the output pulse train is equal to the frequency of the pulse train produced by the work piece encoder 25 when the work piece 17 is running in correct engagement with the grinding wheel 14. This normally requires the setting of the values M and D to be a function of the number of teeth on the work piece gear 17 and the number of grating lines on the two encoder discs.

The two pulse trains are fed into a reversible counter 29 which is a 256 bit up/down binary counter with overflow inhibited at each end. Each pulse from the electronic gear box 24 increments the count, whilst each pulse from the eccentricity logic 28 decrements the count. Thus, if the two pulse train frequencies are equal, the count will oscillate by one digit either side of a specific number.

The output of each binary register in the counter 19 is connected to a digital-to-analogue converter 30, the output of which is arranged to be zero when the counter is half full and to swing positive and negative either side of this figure. The analogue signal passes through a series of amplifiers 31 (with appropriate feedback networks for servo response compensation) and thence to the control winding or armature of the work piece driving motor 19. The servo thus provided is not a velocity servo in which case very small errors in velocity would gradually integrate to give relatively large positional errors. Small errors in the arrangement would be manifest as small constant angular displacements.

However, this is overcome by incorporating differential feed forward in the form of discriminator 32 which is connected between the output of the gear box 24 and the servo amplifiers 31. The discriminator produces an analogue voltage proportional to the frequency of the input pulse train. The gain of the discriminator 32 may be adjusted until the system runs at any demand speed with zero output from the digital-to-analogue converter 30, i.e., zero positional error. Once, this adjustment has been made, the system will run at all speeds with zero servo error, the motor drive signal being produced by the demand signal from the discriminator 32.

In addition to the control of the two rotary motions so far described, two further motions are involved in gear grinding, i.e. the infeed motion of the wheel 14 and work piece 17 for determining the depth of cut and the cross feed motion, i.e., the relative movement of the wheel 14 and work piece 17 across the periphery of and parallel to the axis of the work piece.

Cross feed motion of the work support 18 is effected by a motor 33. In practice such feed is a slow motion and for spur gears (i.e., of zero spiral angle) the speed is determined solely by grinding conditions.

In the grinding of helical or spiral tooth gears the angle of inclination of the axis of the grinding wheel 14 to the axis of the work piece 17 (i.e., corresponding to the lead angle of the helix of the grinding wheel rib form) requires to be modified by the spiral angle of the work piece 17. In addition the speed of rotation of the work piece 17 is modified by a factor dependent on the lead of the work piece and the rate of cross feed relative to the grinding wheel 14. For this purpose, a linear encoder 1,9 according to FIG. 1 is attached between the support 18 and a frame member of the machine.

The pulse train from the linear encoder 1,9 is fed to an adjustable electronic gear box 34 and thence to a gate 35. The gate 35 accepts the pulse trains from electronic gear box 24 and eccentricity logic 28 and adds the pulse train derived from gear box 34 either to the pulse train from electronic gear box 24 or the pulse train from eccentricity logic 28, depending on whether the spiral angle of the work piece gear 20 is right-hand or left-hand. For this arrangement the frequency of the pulse train from linear encoder 1,9 and the angle $\alpha$ of the encoder 1,9 will be calculated in relation to the requisite system parameters as already described. Thus, in the specific example, $\alpha$ will be set to 5° 48' and the gear box 34 will be set to deliver one pulse for every seventy two received.

Figure 4:
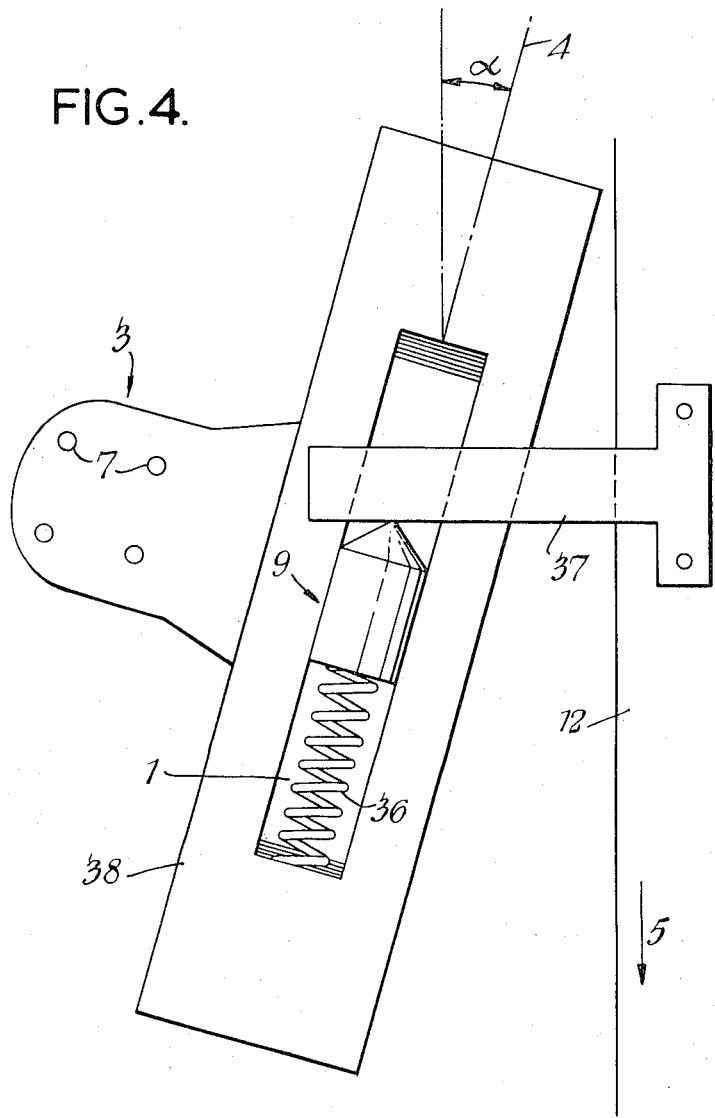
FIG. 4 shows a modified form of digital sensing device.

In certain instances, it may be convenient to use a grating of conventional width and to allow the reading head to move along the centre line of the grating. The necessary adjustment to the distance travelled for a predetermined number of pulses can be assured by setting the grating at the appropriate angle but with the reading head not rigidly connected to the slide. With such an arrangement the movement of the slide would be the hypotenuse of a triangle and the reading head would move along the base of the triangle, as shown in FIG. 4. In this case the head 9 is biased by a spring 36 against a bracket 37 connected to the slide 12. The head 9 is guided on a linear path at angle $\alpha$ by a guideway 38 and slides along the bracket 37 during motion of the bracket in the direction of arrow 5.

I claim:

1. A mechanism having two relatively movable parts and a digital displacement sensing device for detecting the relative linear motion of the two parts of the mechanism, the device including: a first member which comprises a linear scale carried by one of said parts and having a plurality of digital indicators; a second member which comprises a scale reading element mounted on the other of said two parts so that said scale reading head can traverse relative to the linear scale; and means for selectively adjusting the angle between the length direction of said linear scale and the intended direction of the relative motion of said two parts of a mechanism, whereby the extent of the relative motion in said direction and corresponding to the distance between two of said digital indicators of said scale can be adjusted finely.

2. A mechanism as claimed in claim 1, and comprising means enabling said head and scale to effect relative motion along a path at said angle to said length direction.

3. A mechanism as claimed in claim 2, and comprising respective mounting means for said scale and said head, each of said mounting means having means for rotating and holding the associated scale and head for adjusting said angle without changing the relative angular position of said scale and said reading head.

4. A mechanism as claimed in claim 1, and having means enabling said reading head and scale to effect relative motion in said length direction as said parts of the mechanism effect relative movement in said intended direction at an angle to said length direction.

5. A mechanism as claimed in claim 4, and comprising guide means for guiding one of said head and said scale for movement relative to the other of said scale and head in the direction of said length direction, biasing means acting between said scale and head in one direction of said length direction and actuating means for slidably acting on said one of said head and scale in said intended direction of movement to achieve said relative movement in the opposite direction of said length direction whilst permitting sliding movement between said one of said scale and head and said actuating means.

6. A mechanism as claimed in claim 1, wherein said reading head includes a scale and light sensing means for detecting Moire fringes set up by said scales.

7. A mechanism as claimed in claim 6, wherein said adjusting means are effective to adjust said angle without changing the relative angular position of said scales.

8. A mechanism as claimed in claim 1, and including an electronic control system connected to receive signals from said reading head.

9. A mechanism as claimed in claim 1, wherein said angle is adjustable over a range of at least 0° to 15°.

* * * * *